BYRRELL W. BULLOCK
SHIRLEIGH SILVERMAN
INVENTORS

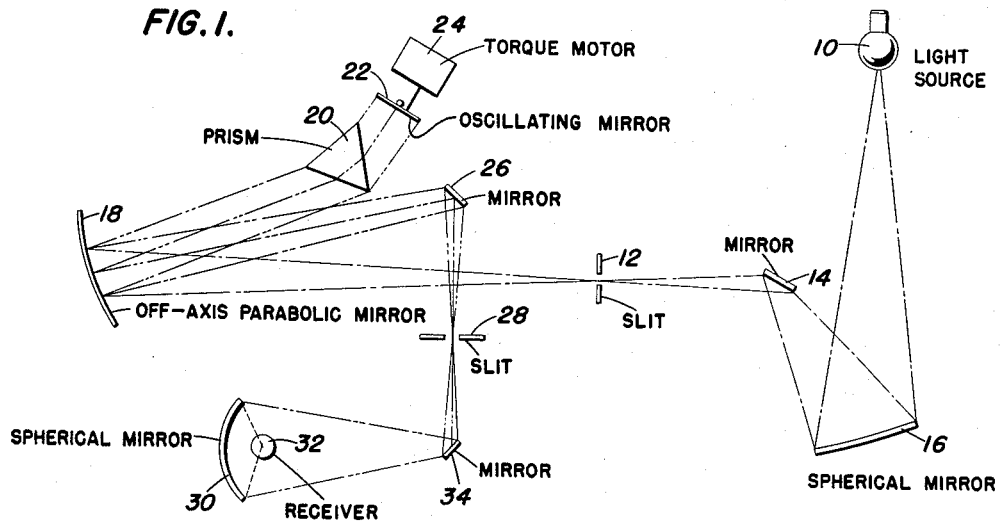
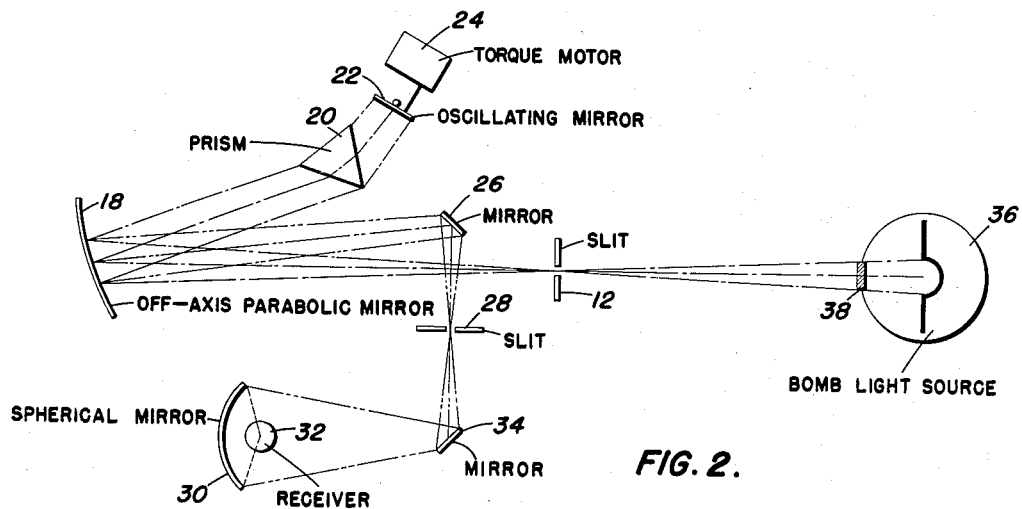

Nov. 15, 1955     B. W. BULLOCK ET AL     2,723,589
RAPID SCANNING SPECTROMETER
Filed May 8, 1952     5 Sheets-Sheet 4
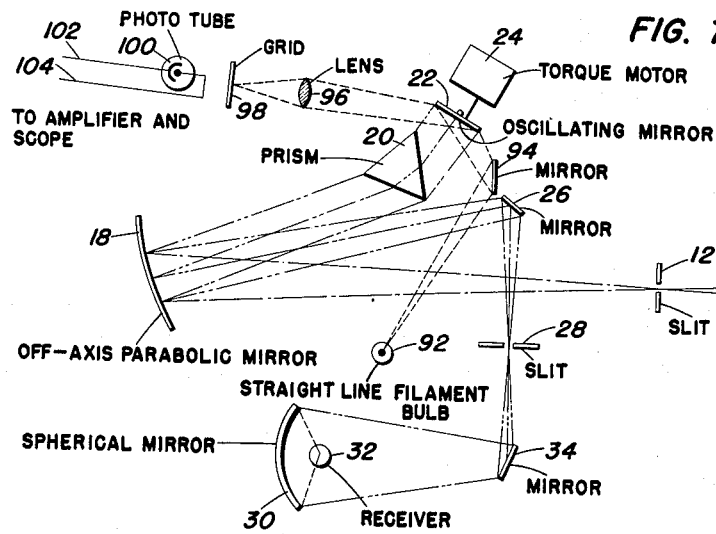
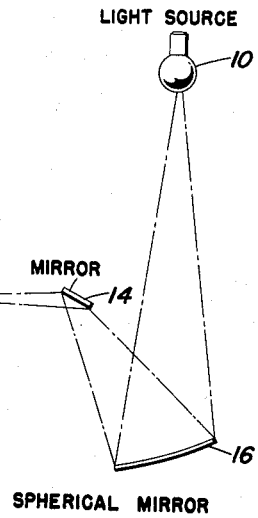
FIG. 7.
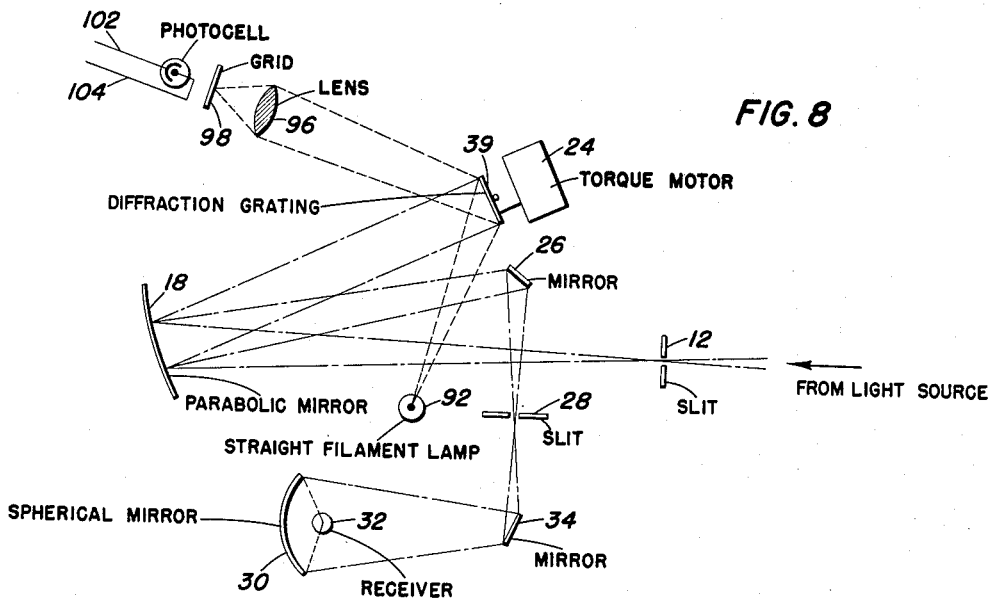
FIG. 8
BYRRELL W. BULLOCK
SHIRLEIGH SILVERMAN
INVENTORS
BY
ATTORNEYS

BYRRELL W. BULLOCK
SHIRLEIGH SILVERMAN
INVENTORS

United States Patent Office 2,723,589
Patented Nov. 15, 1955

2,723,589

RAPID SCANNING SPECTROMETER

Byrrell W. Bullock and Shirleigh Silverman, Silver Spring, Md., assignors to the United States of America as represented by the Secretary of the Navy Application May 8, 1952, Serial No. 286,766

4 Claims. (Cl. 88—14)

The present invention relates to spectrometers. More specifically this invention pertains to a rapid-scanning spectrometer that is particularly useful in studying the infra-red region of the spectrum, but which is not necessarily limited to operation in such region. The spectrometer, for example, can be used in the ultra-violet region.

Prior to the present invention, it had been customary to produce visible spectra by means of a suitable prism or diffraction grating, and observe or photograph them directly, when the wave lengths fell within certain limits. The invisible spectrum, such as the infra-red region, was explored by means of special apparatuses, such as thermocouples, or other temperature-responsive devices, and photoelectric cells of suitable types. This was a tedious procedure, and was obviously not suitable for investigating rapidly varying phenomena, or phenomena of short duration, such as explosions.

It is one of the principal objects of this invention to make it possible to observe such phenomena by providing a system wherein electronic amplifiers are used to increase the intensities of signals derived from the spectra to be investigated, and causing the amplifier output to produce a luminous trace on the screen of an oscilloscope, which may be examined visually and/or photographed.

Another object of the invention is to provide a spectrometer that rapidly produces a trace, indicating the distribution of the energy in the spectrum, that may be either observed visually or recorded photographically.

To provide a system that is simple and reliable in operation, and one that is particularly useful in viewing and studying the infra-red region of the spectrum, are also other objects of this invention.

Other objects and many of the attendant advantages of this invention will be appreciated readily as the same becomes better understood by reference to the following detailed description, when considered in connection with the accompanying drawings, wherein:

Fig. 1 is a schematic showing the optical elements of one form of spectrometer wherein a prism is used as the dispersing element, and a light source, such as a hot filament, an electrical discharge through a gas or vapor, or a flame, is the source of radiation to be investigated;

Fig. 2 is a schematic of an optical system substantially identical with that of Fig. 1, but modified by substituting an enclosed "bomb" as the light source, and omitting two of the reflectors;

Figure 3:
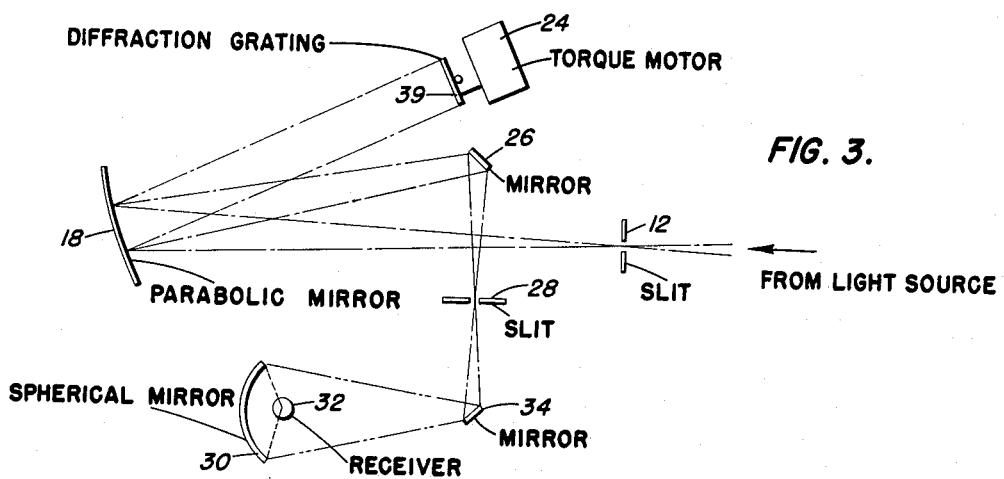
Fig. 3 is a fragmentary diagram illustrating a further modified form of the invention wherein a diffraction grating is substituted for the prism shown in Figs. 1 and 2, and which serves also as the oscillating reflector.
Figure 4:
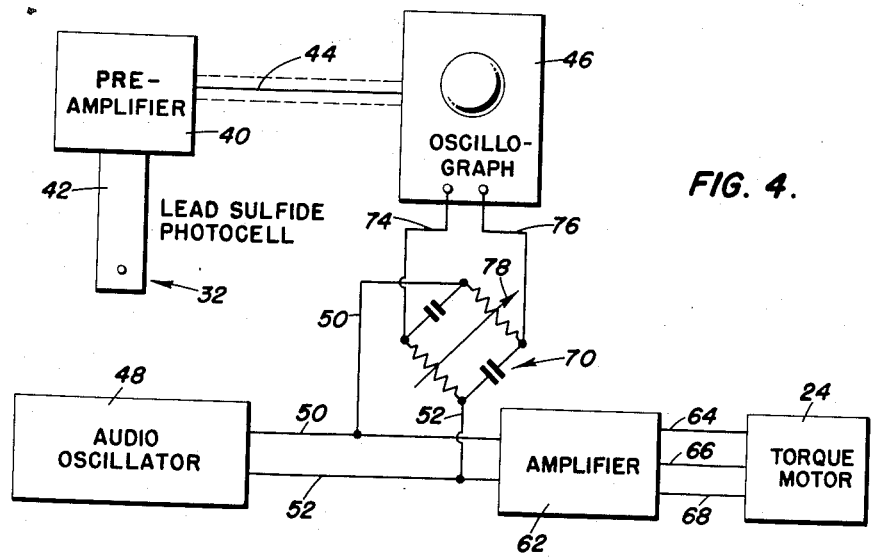
Fig. 4 is a block diagram of the electrical system used with each of the optical systems illustrated in Figs. 1, 2 and 3.
Figure 9:
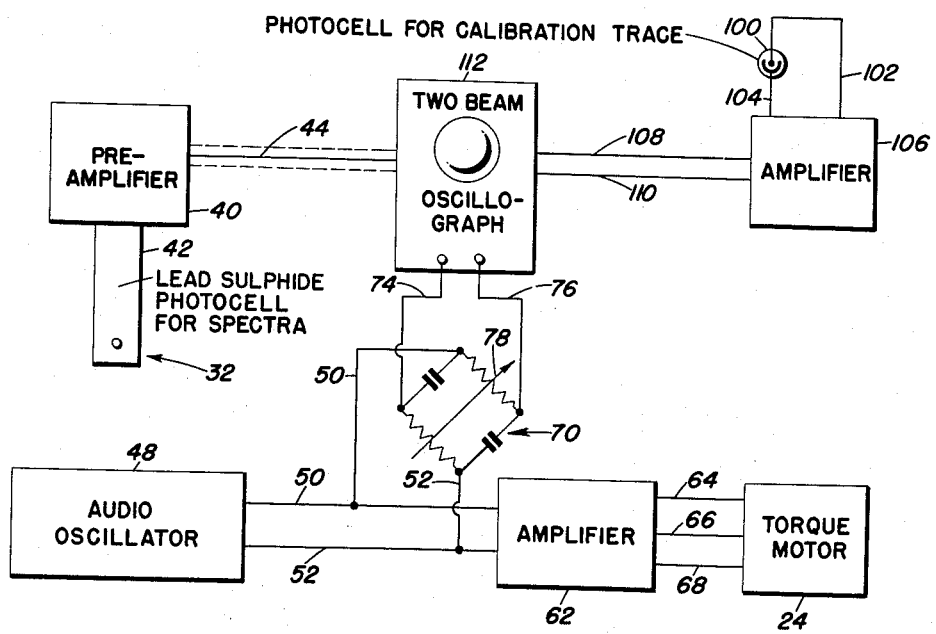

Fig. 7 corresponds to Fig. 1, with the addition of a system to provide calibration marks on the cathode ray oscilloscope;

Fig. 8 corresponds to Fig. 3, with the addition of a system to provide calibration marks on the cathode ray oscilloscope; and Fig. 9 is a modification of the arrangement shown in Fig. 4.

In accordance with the invention, rapidly varying phenomena, or phenomena of short duration, are investigated by passing the radiation to be studied through a slit. This radiation is then reflected from a suitable curved mirror through a prism, and then to the surface of an oscillating mirror, then back to the curved reflector. However, this time the radiation is passed through a second system of mirrors, and a second slit to a spherical mirror that reflects the radiation to a photoelectric cell. The signal generated by the photoelectric cell is then amplified and fed to the vertical-deflection plates of an oscilloscope, having a horizontal sweep synchronized with the oscillating mirror, where it is either visually studied or photographed.

Referring now to the drawings, there is shown in Fig. 1, a light source 10, shown conventionally as an incandescent filament, but which also may be of practically any other type, such as an electric arc, a glow lamp, a flame, or the like, which is used as the source of the radiations to be analyzed by the spectrometer. A slit 12 is also provided, as well as a small front surface plane mirror 14 and a spherical reflector 16, these elements being located as shown, with the light source 10 and slit 12 at conjugate foci of the reflector 16, so that an image of the source 10 is produced in the plane of the slit 12. It will be understood that the sole purpose of plane mirror 14 is to make a more compact arrangement possible, as a matter of convenience.

The radiation that passes through the slit 12 continues to diverge until it strikes the front surface of an off-axis parabolic reflector 18, placed with its principal focal plane at the slit 12, whereby the reflected rays are made parallel. These parallel rays are received by a prism 20, made of a material suitable for the region of the spectrum concerned, for instance, glass, quartz, lithium fluoride, rock salt, potassium chloride-bromide, and many others.

After passing through the prism 20, the refracted rays proceed at an angle to their former direction and strike a front-surface plane mirror 22. This mirror is kept oscillating by a suitable means, such as a torque motor 24, which will be discussed in detail hereinafter. The mirror 22 returns the rays almost on their incident courses, but intentionally at a slight angle thereto, so that after passing again through the prism 20 and back to the parabolic reflector 18, the axis of the reflected rays will be at a small angle to their original axis, whereby physical clearance is provided between the entering and leaving rays. Of course, in addition to refraction, the rays have also suffered the desired dispersion by twice traversing the prism 20.

While the rays are substantially parallel between reflectors 18 and 22, on again leaving the parabolic reflector 18 they become convergent. This convergent pencil of rays is received by the front-surface plane mirror 26, and reflected to a second slit 28, which is in the focal plane of the reflected rays.

After emerging from slit 28, the rays again diverge. This divergent pencil is received by a suitable spherical reflector 30 and concentrated thereby on a receiver 32, which may be a photoelectric cell. Other types of radiation detecting devices can be used such as a thermocouple, resistance bolometer, pneumatic detector, thermistor bolometer, or photo-sensitive detector of the photoemissive or photo-conducting type. For convenience, to make the apparatus compact, an additional front-surface plane mirror 34 may be provided as shown.

It will be understood that every reflection occurring in the system as a whole should be from a suitable front surface, so that no absorption losses occur and no changes in relative intensity are produced by selective absorption. The prism 20 must, of course, be traversed by the rays in order to produce the desired dispersion. This may be avoided by substituting a reflecting-type diffraction grating for the prism 20. This is disclosed as a modification herein in Fig. 3, and will be discussed later.

In the second embodiment, shown in Fig. 2, the system is substantially identical with that of Fig. 1, the chief difference being that a special light source is substituted for source 10. A "bomb" 36 replaces not only the light source 10, but also the reflectors 14 and 16, the bomb 36 being placed directly in front of the slit 12, and at a suitable distance from the latter. This bomb is a strong metal hollow sphere with a window 38, transparent to the radiation to be observed, facing the slit 12. The material of which this window is made may be the same as that of of prism 20 and may be changed from one set-up to another, to suit the conditions. The remainder of the apparatus is identical with that illustrated in Fig. 1, and already described, and is identifid by the same reference characters.

The bomb is used in studying flames of controlled-ratio mixtures, and at controlled pressures, both at normal atmospheric pressure and in ranges above and below the same. This bomb may thus be considered merely as a specialized light source, for investigating explosive as well as non-explosive gaseous mixtures, of various oxygen-fuel ratios and at various pressures.

As mentioned above, it is sometimes desirable to eliminate all transmission elements from the optical system, and to relay entirely on reflection, to avoid absorption and/or cut-off of certain regions of the spectrum. This is accomplished by the system shown in Fig. 3.

Here a diffraction grating 39 of the reflecting type is substituted for prism 20 and oscillating mirror 22. The grating 39 is mounted on the torque motor 24 in place of the mirror 22. In other respects, the system remains substantially as shown in Figs. 1 and 2.

The systems so far described, and shown in Figs. 1, 2 and 3, stop short at the receiver 32. It is necessary to provide means for amplifying the output of receiver 32, which normally is too weak to be useful for direct observation or recording.

In Fig. 4 there is shown, in block diagram form, how this may be accomplished. Starting at the receiver 32, which may be a lead sulfide photocell if the infra-red region is being investigated, a preamplifier 40 is connected directly to the casing 42 of this cell. This preamplifier 40 may include a first triode connected as an amplifier, and a second triode connected as a cathode follower, to reduce the impedance level of the output, delivered through shielded conductor 44 and its sheath to the vertical-deflection system of an oscillograph 46. The reason for operating at low impedance level is to reduce the pickup of external disturbances by the line 44 which often may have to be made relatively long.

An audio-frequency oscillator 48 is set to a desired signal frequency, which is delivered through conductors 50 and 52 to an amplifier 62. Amplifier 62 is of the push-pull type, using, for example, 6L6 output tubes, and its output is delivered through the three conductors 64, 66 and 68 to the torque motor 24 to operate the latter.

The conductors 50 and 52 also serve to provide triggering pulses to the linear sweep circuit of the oscillograph. However, as it is necessary to synchronize the sweep not only in frequency but also in position, with respect to the torque motor 24, a phase-shifting network 70 is interposed between conductors 50 and 52, on the one hand, and the out-put conductors 74 and 76 on the other. This network is here shown as a resistor-capacitor bridge, with two ganged variable resistors controlled by a single adjusting arm 78. This type of phase shifter affords approximately a 180° shift. Its operation will be explained subsequently.

Figure 5:
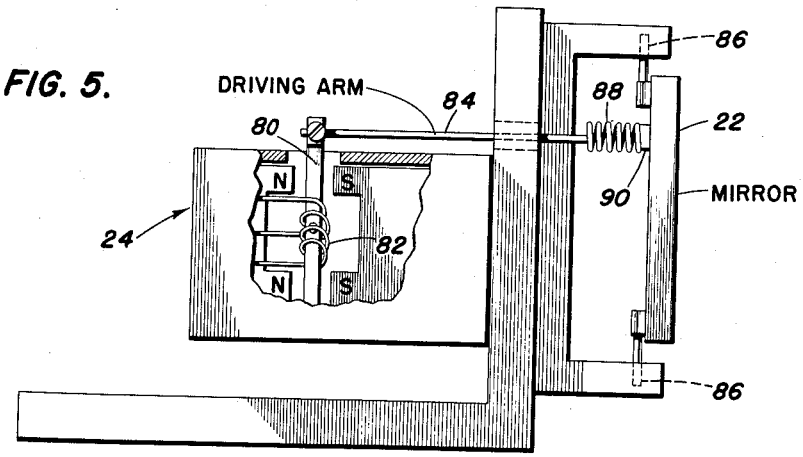
Fig. 5 is a side elevation of a torque motor and a mirror oscillated thereby.
Figure 6:
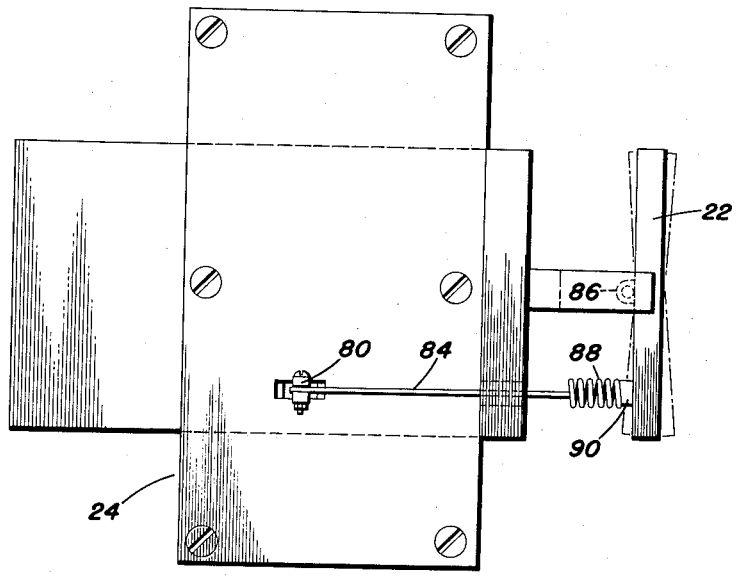
Fig. 6 is a corresponding plan of the arrangement illustrated in Fig. 5.

The torque motor 24 will now be described briefly, with reference to Figs. 5 and 6. The detailed structure is not a part of the present invention. The principle of operation is that an armature member 80, of soft iron or equivalent material, and pivotally mounted at or near its center, has each end held in an air gap between stationary magnet poles, N and S. A center-tapped winding 82 surrounds the armature and for one direction of current flow therein will produce a N pole at one end of the armature 80 and a S pole at the other. The ends of the armature will then tend to move oppositely about the central pivot, in accordance with the well known laws of magnetic attraction and repulsion. Upon reversal of current flow, the armature will likewise tend to reverse its position, and thus an alternating current in the winding will cause the armature to oscillate at a rate corresponding to the frequency.

A rod 84 is connected to one end of the armature 80 to transmit the oscillation to the mirror 22, or the grating 39, whichever is used. The mirror 22 is mounted on pivots 86 and the rod 84 is connected to the mirror 22 at a location spaced from the pivotal axis, as shown in Fig. 6. The connection is made to a stud 90 on the mirror 22, a stiff helical spring 88 being secured at one end to the stud and at its other end to the rod 84, as by soldering. It is the function of spring 88 to act as a knuckle or pivot to prevent breakage of the driving link. If a straight rod were used instead of spring 88, breakage of this rod would occur within a few seconds. Thus, spring 88 eliminates this possibility of loss of drive to mirror 22. Spring 88 should be of the general type that is flexible sideways but not longitudinally. It will be understood that exactly the same structure may be used to oscillate either the mirror 22 or the diffraction grating 39 that sometimes replaces the former.

In order to facilitate the identification of spectral lines, an arrangement, such as indicated in Figs. 7, 8 and 9, has been provided for producing calibration marks on the screen of a two-beam cathode ray oscilloscope.

This arrangement consists of a straight line filament bulb 92, a mirror 94 to reflect light to the vibrating mirror 22 in Fig. 7 (this mirror 94 is not necessary in the system shown in Fig. 8), a lens 96 to focus the light from the vibrating mirror 22 on a grid 98 which is an enlargement of a 100 line half tone grating (parallel lines) in which lines have been blanked out in such a manner as to code each decade of lines. The filament of the straight line filament bulb 92 is focused on the grid 98, and the position of the bulb 92 and the grid 98 are such as to produce about a two to one (2–1) reduction in image. The lines are sufficiently wide to allow complete darkening of the cell when a light is positioned squarely on the line. A photo-cell 100 having suitable response characteristics is placed at an appropriate distance behind grid 98 to receive light which passes through the grid 98. The output of the photo-cell 100 is fed through conductors 102 and 104 to an amplifier 106 (shown in Fig. 9) which shapes the pulses and produces a sine wave voltage which then may be fed through conductors 108 and 110 to the cathode ray oscilloscope 112.

Since the output of the photo-cell 100 indicates the position of the mirror 22 during its cycle, and also shows what angle it has been set for, it may be used as an indication of the portion of the spectrum viewed when compared with suitable comparison spectra. Also since the working pulses are generated by the same mirror 22 that produces the spectrum, alignment of the lens and spectra will hold even though the mirror wobbles during operation.

The spectrum and calibration trace are fed to the two beams of the two-beam oscilloscope 112 of the conventional design, and since the sweep for both traces is operated from a common source, the spectrum and calibration trace are locked together.

The operation of the system will now be described.

Assuming that the image of the source of radiation that is to be studied falls on the slit 12, radiation will proceed from slit 12 to the reflector 18, which renders the rays thereof parallel, then through the dispersing prism 20 to the oscillating mirror 22, back again through the prism 20 to be dispersed further, then back to the reflector 18, which after reflection from mirror 26, is focused on the slit 28. Thence such radiation as passes through slit 28 again diverges, and is caught by reflector 30, finally being focused on the sensitive device or receiver 32, having, say, a photo-cell.

Due to the dispersion produced by the prism 20, and the oscillation of the mirror 22, the slit 28 will periodically receive radiation of different wave lengths, in synchronism with the motion of the mirror 22. Thus at some times "bright lines" of the spectrum will fall on the slit 28, and at other times weak lines, or even "darkness," and the response of the receiver 32 will vary accordingly.

If now the amplified response of this receiver 32 is fed to the vertical-deflection plates of the oscillograph 46, the electron beam in the cathode ray tube thereof will produce varying vertical motion of the spot of light on the fluorescent screen of the tube. If, in addition, a sweep of voltage is applied to the horizontal-deflection plates, the spot will describe a locus on the screen, which will correctly represent the radiation intensity at slit 28 if such sweep is properly synchronized with the mirror 22 oscillations.

This condition is attained by adjusting the sweep frequency control, built into the oscilloscope 46 itself, to the same frequency as the mirror oscillation. However, in order to make the trace begin at the proper instant, the oscillograph 46 is set for "single-sweep" operation and each individual sweep is initiated by a starting pulse transmitted through conductors 74 and 76, and properly phased by the phase-adjusting network 70.

When adjusted properly the oscillograph screen will display a trace wherein the ordinates represent radiation intensity, plotted against frequency as abscissas.

As indicated, the arrangement previously described and illustrated in Figs. 7, 8 and 9, can be utilized to facilitate the identification of the spectral lines. It is not believed that any further description of this arrangement is necessary.

Obviously many modifications and variations of the present invention are possible in the light of the above teachings. It is therefore to be understood that within the scope of the appended claims the invention may be practiced otherwise than as specifically described.

What is claimed is:

1. A scanning spectrometer for investigating rapidly varying phenomena, and/or phenomena of short duration, comprising, a wall having a first slit formed therein for passing radiation from a phenomena to be investigated, a first means for reflecting said radiation and for rendering the rays thereof parallel, dispersal means including a vibrating element for dispersing said parallel rays of radiation and for reflecting said dispersed rays of radiation back to said first reflecting means on a substantially incident course but at a slight angle thereto, a wall having a second slit formed therein, a second means for reflecting said dispersed rays of radiation, said dispersed rays being collected by said first reflecting means and reflected to said second reflecting means to be concentrated at said second slit, means for collecting said rays at a point after passing through said second slit, means for generating an electrical signal corresponding in intensity to said rays collected at said point, means for amplifying said generated signal, means including a viewing screen for receiving the trace of said amplified signal, and means for facilitating identification of the spectral lines of said radiation as represented by said signal by producing a marking trace on said viewing screen, with said signal and marking traces being arranged to be locked together.

2. In a scanning spectrometer for investigating rapidly varying phenomena, and/or phenomena of short duration, a wall having a first slit formed therein for passing radiation from a phenomena to be investigated, a first means for reflecting said radiation and for rendering the rays thereof parallel, dispersal means including an oscillating mirror for dispersing said parallel rays of radiation and for reflecting said dispersed rays back to said first reflecting means on a substantially incident course but at a slight angle thereto, a wall having a second slit formed therein, a second means for reflecting said dispersed rays of radiation, said dispersed rays being collected by said first reflecting means and concentrated at said second slit after being reflected by said second reflecting means, means for collecting said rays at a point after passing through said second slit, means for generating an electrical signal corresponding in intensity to said rays collected at said point, means for amplifying said generated signal, means including a viewing screen for receiving a trace of said amplified signal, and means for facilitating identification of the spectral lines of said radiation as represented by said signal by producing a marking trace on said viewing screen, with said signal and marking traces being arranged to be locked together.

3. An arrangement as set forth in claim 2, wherein said dispersal means comprises a prism.

4. An arrangement as set forth in claim 2, wherein said dispersal means comprises an oscillating grating.

References Cited in the file of this patent

UNITED STATES PATENTS

| | | |
|---|---|---|
| 2,339,053 | Coleman | Jan. 11, 1944 |
| 2,437,323 | Heigl et al. | Mar. 9, 1948 |
| 2,444,560 | Feldt et al. | July 6, 1948 |
| 2,483,746 | White | Oct. 4, 1949 |
| 2,502,319 | Golay | Mar. 28, 1950 |
| 2,597,001 | Jaffe | May 20, 1952 |
| 2,602,368 | Barnes | July 8, 1952 |

OTHER REFERENCES

Baly text, "Spectroscopy," vol. 1, third edition, pages 14–17, 1924, published by Longmans, Green & Co., New York, New York.

Harrison et al., text, "Practical Spectroscopy," pages 32–35, 1948, published by Prentice Hall Inc., New York, New York.